United States Patent [19]
Buelens et al.

[11] Patent Number: 4,597,658
[45] Date of Patent: Jul. 1, 1986

[54] LIGHT-TIGHT CASSETTE

[75] Inventors: Edward Buelens, Kontich; Carolus C. Goossens, Berchem, both of Belgium

[73] Assignee: Agfa-Gevaert N.V., Mortsel, Belgium

[21] Appl. No.: 678,469

[22] Filed: Dec. 5, 1984

[30] Foreign Application Priority Data

Dec. 12, 1983 [EP] European Pat. Off. ........ 83201748.7

[51] Int. Cl.⁴ ............................................. G03B 17/26
[52] U.S. Cl. .................................... 354/275; 206/409; 242/71.1
[58] Field of Search ............... 354/275; 352/72, 78 R; 206/316, 407, 409; 242/71.1, 71.2, 71.7

[56] References Cited

U.S. PATENT DOCUMENTS

| | | | |
|---|---|---|---|
| 3,551,037 | 12/1970 | Pammer | 352/78 R X |
| 3,784,001 | 1/1974 | Bushnell et al. | 206/316 |
| 4,272,035 | 6/1981 | Sherman et al. | 242/71.7 X |
| 4,291,802 | 9/1981 | Buelens | 242/71.1 X |
| 4,403,845 | 9/1983 | Buelens et al. | 354/275 |

OTHER PUBLICATIONS

Research Disclosure, No. 15033, Oct., 1976.
Research Disclosure, No. 16352, Nov., 1977.

*Primary Examiner*—Michael L. Gellner
*Attorney, Agent, or Firm*—William J. Daniel

[57] ABSTRACT

A light-tight cassette (1) suitable for holding a roll of web-like light-sensitive photographic material (2) wound around a core (6) and for dispensing the photographic material through a slit (19) provided in the cassette which is in the form of a box comprising a hollow shell portion (3) whose wall at three of its corners is at least partly and locally realized as a double wall and two end closure walls (4, 5) which are secured to the shell portion (3) by perforations provided in the outer wall of the double wall portions of the shell and cooperating detent fingers on the end closure walls. The inner wall of the double wall portions of the shell prevents light from intruding into the cassette through perforations in the outer shell wall and makes the cassette perfectly light-tight.

6 Claims, 4 Drawing Figures

LIGHT-TIGHT CASSETTE

The present invention relates to a light-tight cassette for holding a roll of web-like light-sensitive photographic material wound around a core and for dispensing the photographic material through a slit provided there.

The invention is generally useful in all cassettes of the type used in apparatus to be fed with web-like photographic material and is particularly advantageous in cassettes intended to be used in apparatus for microfilm and phototype-setting purposes.

Cassettes for holding a roll of light-sensitive material are known which are in the form of an elongated square-shaped box in which the roll of photographic material is rotatably supported and which has one of its side walls an elongated exit slit through which the photographic material can be drawn.

Many of the known types of cassettes may themselves be made relatively cheaply as a consequence of the kind of materials used for their construction. However, the assembling and loading thereof are often quite time consuming so that the overall costprice of the final product, i.e. the cassette loaded with photographic material, is unfavourably influenced.

On the other hand, the dimensional or structural stability of such cassettes is often not quite sufficient, and quite frequently they suffer from problems with regard to light-tightness, unsafe locking and in some cases they even seem to be insufficiently moisture proof too.

Most of the abovesaid drawbacks of known cassettes are to be imputed to the fact that the locking means intended for the assembly of the component parts of such cassette are either impractical and inadequate or not sufficiently light-tight.

The present invention aims to provide an improved cassette which does not show the abovementioned disadvantages of prior art cassettes as the locking means intended for the assembly of the new cassette are disposed in such a way that the improved cassette is structurally very stable and absolutely light-tight and they are constructed so as to facilitate considerably loading and assembly even in darkroom conditions and yet the component parts of said cassette are easy to manufacture by known moulding and/or extrusion techniques.

It is particularly important indeed both to manufacturers of loaded cassettes and to users who may wish to reload their cassettes in a darkroom, that such cassette is easy to close firmly and yet is perfectly light-tight.

According to the present invention there is provided a light-tight cassette suitable for holding a roll of web-like light-sensitive photographic material wound around a core and for dispensing the photographic material through a slit provided in said cassette wherein the cassette is in the form of a box comprising a body shell and end closure walls having central inwardly projecting hub portions for rotatably supporting said roll within the box, wherein the wall of said shell is at least partly and locally realized as a double wall structure, and wherein detect means are provided on at least one of said end closure walls cooperating with perforations provided in the outer wall of the double wall or double wall portions of said shell so as to realize the locking of said end closure wall or walls to said shell, and wherein the inner wall of said double wall or double wall portions serves as a shield preventing ambient light from entering into said cassette through the perforations in the outer wall of said double wall or double wall portions.

Depending upon the type of apparatus in which the cassette of the invention is to be used, the cassette may have any suitable form, e.g. prism, cube, parallelepipedon, cilinder, and advantageously its end closure walls substantially correspond in shape with the cross-section of its shell.

An exit slot running parallel to the axis of said hub portions is preferably extending in a side wall along the full width of the shell between the two end closure walls and is preferably provided with means for preventing light from penetrating through such exit slot into the assembled cassette.

Advantageously, both end closure walls are removable and have radially spaced inner and outer peripheral wall portions defining, at a peripheral zone from which the corresponding hub portion axially protrudes, a peripheral groove or channel for receiving an end edge of the shell, and are locally provided with axially projecting tongues which extend from the inner face of the end closure wall fitting into matching hollow spaces defined by double wall portions of the shell.

The fitting of the end closure walls to the shell is greatly facilitated with end closure walls of the type defined hereabove. When fitting an end closure wall to the shell, its axially protruding portions of the closure wall enter the shell edge before the shell extremity enters the peripheral groove and thus facilitate correct angular orientation of the end closure wall relative to the shell preparatory to such entry. Moreover, the hub portion of such end closure wall can enter the core of a roll of light-sensitive photographic material before the said shell extremity enters the said peripheral groove in said end closure wall.

In a preferred embodiment the cassette of the invention comprises two removable end closure walls of the type defined hereabove wherein each end closure wall is a mirror image of the other. Advantageously they are made of plastic material, e.g. by injection moulding, and the shell is preferably, but not exclusively, formed by a length cut from a plastic extrusion.

In a cassette according to the present invention a core-locking or anti-rotation device may be provided and may comprise an opening in at least one of said end closure walls through which a key can be inserted into the cassette loaded with a roll of web-like light-sensitive photographic material that is wound around a core. Advantageously, such core substantially consists of two concentric cilinders which are secured to one another by a peripherally spaced plurality of radially extending spokes or vanes. When the key is inserted into the cassette, it proturdes between two adjacent spokes or vanes of said core and locks the latter within the cassette so as to prevent any rotation of said core within said cassette. Clock-springing of the roll of photographic material wound around such core is thereby greatly prevented. This provision is particularly advantageous when transporting and handling a cassette loaded with a roll of light-sensitive photographic material. Any other suitable engagement, e.g. frictional engagement, of the key with the core may be used as well for the purpose of preventing rotational movement of the core within the cassette.

The key and core can be made of any material that is sufficiently rigid for the purpose described hereabove.

Means are provided within the said core and/or end closure wall or walls to make the core-locking device light-tight irrespective of whether or not a key is inserted into the cassette. Preferably the latter means comprise a light-labyrinth provided within the very structure of the cassette, possibly in combination with means within the said core and which can also contribute to make the light-locking means of the cassette perfectly light-tight independent the particular way for locking the core.

In another embodiment of the cassette according to the invention one of the end closure walls is made integral with the shell and forms the bottom of the cassette whereas the other end closure wall is realized as a removable lid.

One practical embodiment of a cassette according to the present invention will be described hereinafter as a non limiting example and with reference to the accompanying drawings, wherein.

Figure 1:
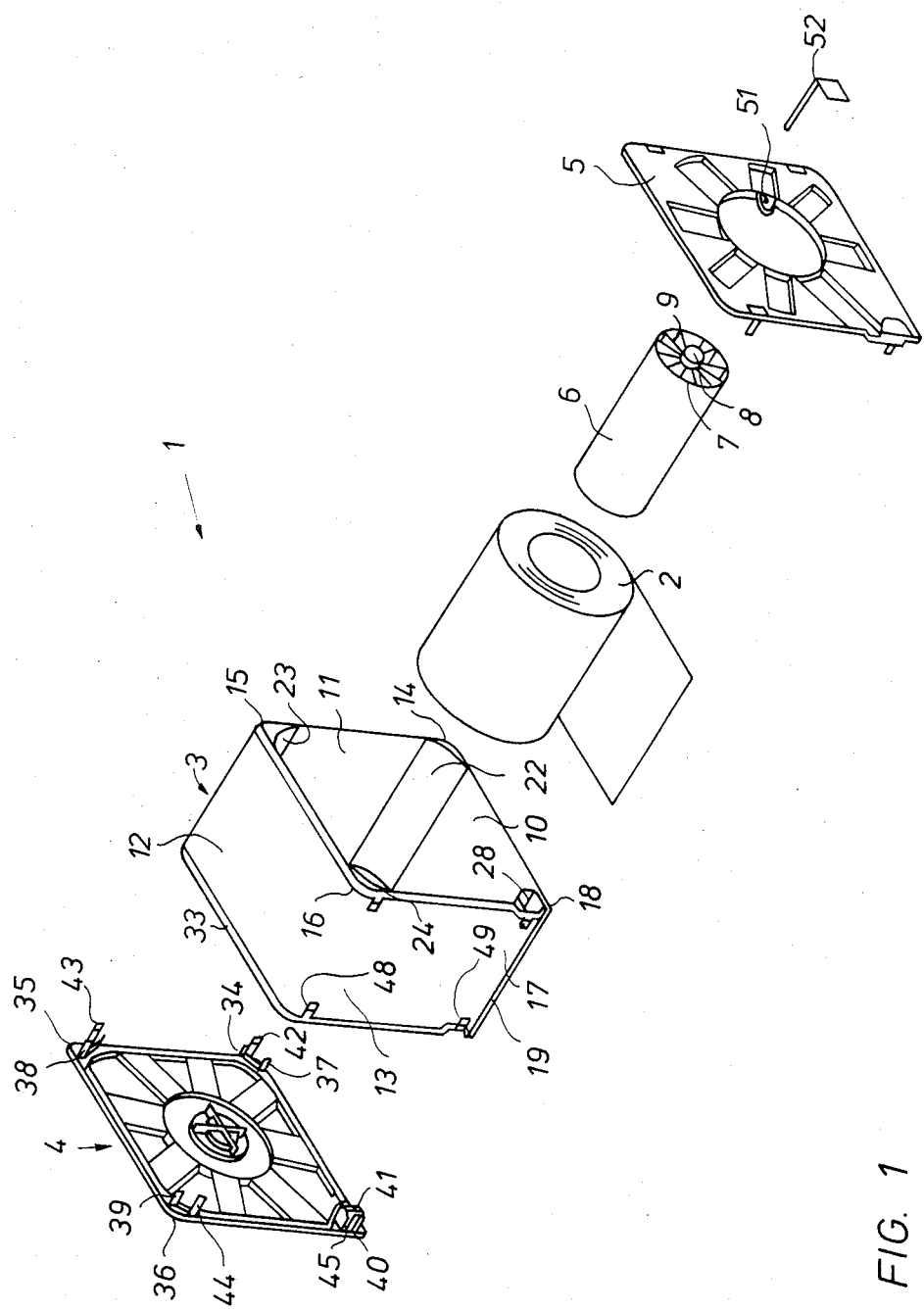
FIG. 1 is an exploded view of one embodiment of a cassette according to the present invention.

Referring to FIG. 1, a cassette 1 for holding a roll of web-like light-sensitive photographic material 2 comprises a hollow shell body portion 3 and two removable end closure walls 4 and 5. The web-like photographic material 2 is wound around a core 6 substantially consisting of two concentric cylinders 7 and 8 which are interconnected by a plurality of radially extending spokes or vanes 9. Shell 3, end closure walls 4 and 5 as well as core 6 are made of plastic material and are formed either by injection moulding or by extrusion.

Figure 2:
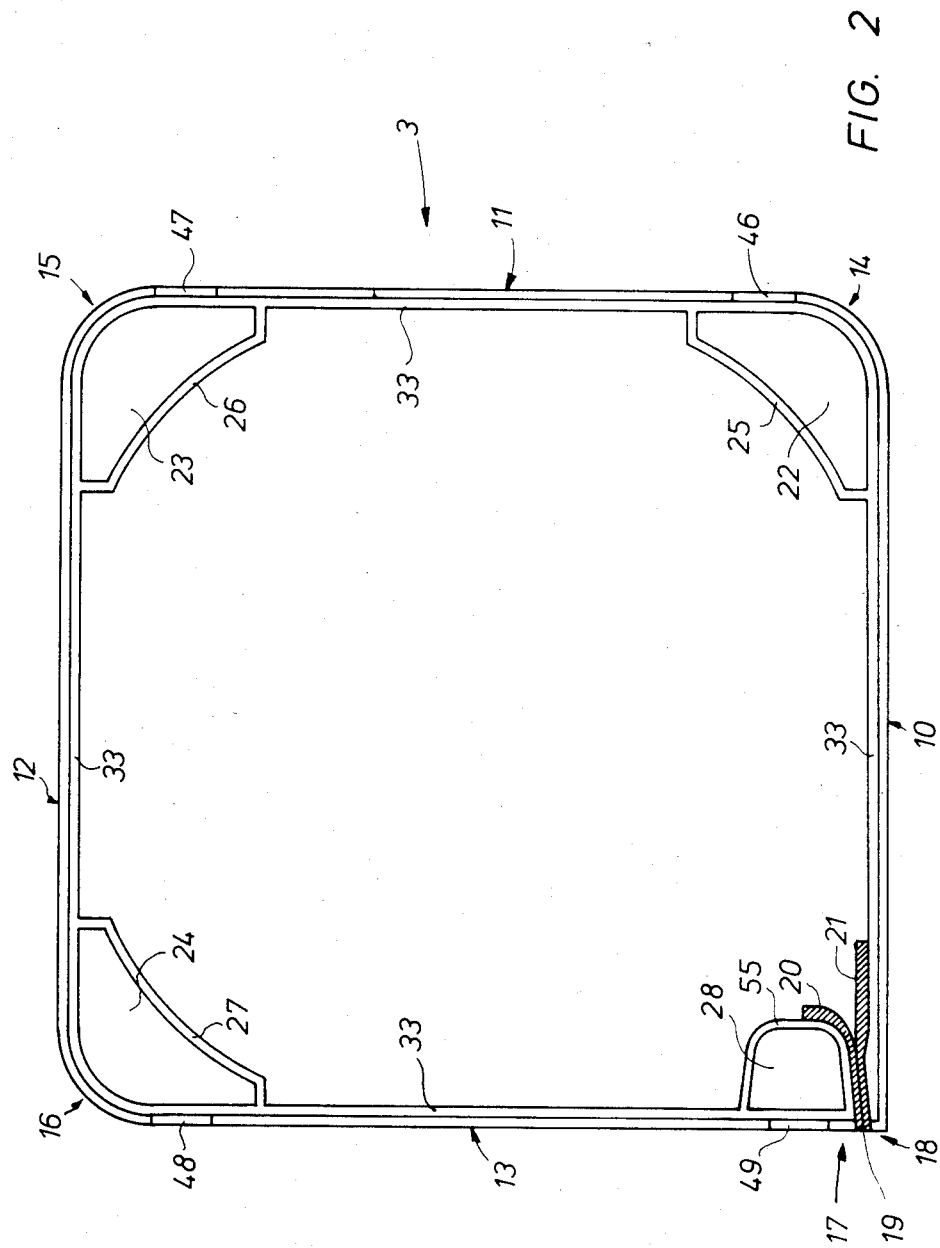
FIG. 2 is a side view of the shell portion.

The shell portion 3 is represented in more detail in FIG. 2 and comprises four substantially flat side walls 10 to 13 joined together in substantially rectangular relationship by three successive rounded corner portions 14 to 16 thereby leaving two free edges 17 and 18 for defining an exit passageway or slit 19 extending over the axial width of shell 3 and through which the web-like photographic material can be dispensed as it is withdrawn from roll 2. The inner side of the facing edges 17 and 18 of shell 3 are provided with strips of resilient material 20, 21 respectively, such as velvet, felt or soft plastic material so as to make the exit passageway 19 light-tight. In the present practical embodiment the corner portions 14 to 16 of shell 3 are realized as double wall portions, including an inner wall 25, 26, 27 of longer radius than the associated outer wall 14, 15, 16, which form integral parts of said shell 3 and which are moulded or extruded simultaneously therewith. As a result three elongated hollow spaces 22 to 24 defined between the inner and outer walls with a substantially triangular cross-section are present inside the shell 3. As is shown in FIG. 2 the inner of said double walls, vis. the walls 25 to 27 are arcuate in order to guide the photographic material within the cassette when it is unrolled from core 6. At the edge 17 of wall 13 another hollow space 28 with a substantially trapezoidal cross-section is provided and is also to be regarded as a partial double wall portion of shell 3. The hollow spaces 22 to 24 and 28 are extending over the entire axial width of shell 3.

Figure 3:
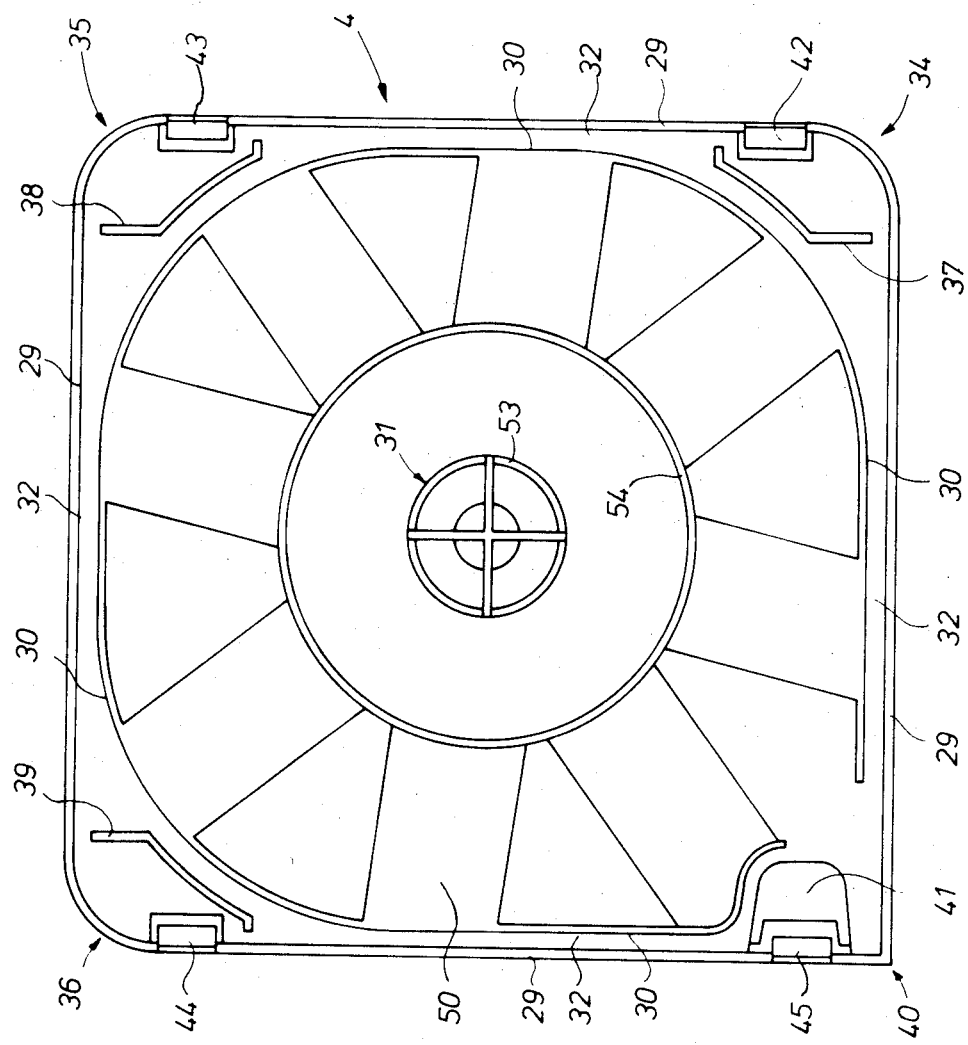
FIG. 3 is a plan view of the inner side of one end closure wall.

The inner face of end closure wall 4 is represented in FIG. 3 and has spaced inner and outer peripheral wall portions 30, 29 respectively, defining at a peripheral zone from which the corresponding hub portion 31 axially protrudes, a peripheral groove or channel 32 for receiving the corresponding end edge portion 33 of shell 3.

At the corner regions 34 to 36 of end closure wall 4, corresponding to corner portions 14 to 16 respectively of shell 3, axially projecting tongue members 37 to 39 are provided within groove 32 which extend axially of the inner face of end closure wall 4.

Tongues 37 to 39 fit into the hollow spaces 22 to 24 respectively of shell 3 and act as guiding means for assembling and closing the cassette. On the other hand the tongues 37 to 39 also provide a structural reinforcement of the assembled cassette. At the fourth corner region 40 of end closure wall 4 an axially protruding tongue 41 is also provided within groove 32 and fits into the hollow space 28 defined by the trapezoidal double wall portion at edge 17 of wall 13 in shell 3.

Adjacent extensions 37 to 39 and 41 resilient detent fingers 42 to 45 carrying hook-like end portions are provided at the outer peripheral wall portions 29 of end closure wall 4. The outer of the double wall portions defining the hollow spaces 22 to 24 and 28 in shell 3 are perforated by holes or slots 46 to 49 arranged to come in registration with detent fingers 42 to 45 respectively when end closure wall 4 is pressed against the corresponding end portion of shell 3. The inwardly directed faces of fingers 42 to 45 are tapered to provide inclined cam faces so that, when end closure wall 4 is pushed into position on shell 3, fingers 42 to 45 first abut against edge 33 of shell 3 and by such abutment become cammed outwards so as to slide along holes or slots 46 to 49 until the hook-like end portions of each of fingers 42 to 45 move into registration with holes 46 to 49 in shell 3 and thereupon spring into said holes 46 to 49 under the elastic recovery forces in fingers 42 to 45, so realizing a snap-locking engagement between end closure wall 4 and shell 3. The same cooperating locking means are provided at the other end of shell 3 and at the corresponding end wall 5. The inner wall 25–27 and 55 of the double wall portions is thus acting as a shield preventing ambient light from entering through the perforations 46 to 49 in shell 3 of the cassette loaded with light-sensitive photographic material.

For the sake of structural rigidity of the assembly some radial or other reliefs or ribs 50 are provided in end closure walls 4 and 5 and the relief pattern is particularly adapted to match specific apparatus in which such cassette is to be used.

An opening 51 is provided in end closure wall 5 through which a key 52 (see FIG. 1) can be inserted into the cassette that cooperates with spokes or vanes 9 of film supporting core 6 for locking the latter within the cassette in order to prevent clock-springing of the web-like photographic material on the core 6. Concentric annular walls 53 and 54 are protruding around hub 31 in the end closure walls in order to establish a light-labyrinth preventing light to fall into the cassette through opening 51 independent from whether or not key 52 is inserted into the cassette.

Figure 4:
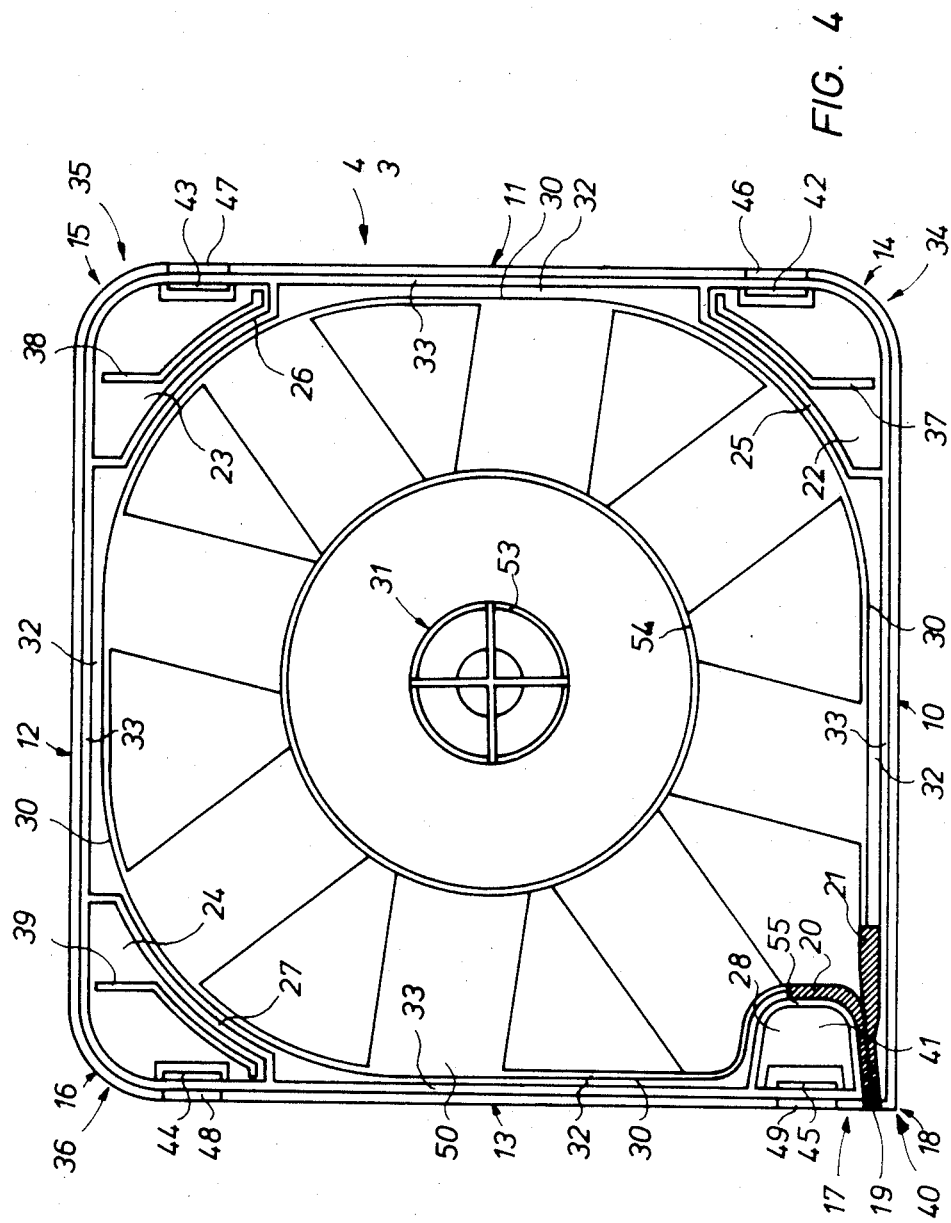
FIG. 4 is a side view of the shell portion of FIG. 2 that is closed at one of its extremities by the end closure wall of FIG. 3.

Rubber joints (not shown) may be provided within grooves 32 and 46 to 49 of end closure walls 4 and 5 and of shell 3 and/or at the end portions of shell 3 in order to make the cassette moisture proof. FIG. 4 shows shell 3 and the end closure wall 4 in snap-locking engagement and it makes clear that the interior of a closed cassette is completely sheltered from daylight as the detent means 42, 46; 43, 47; 44, 48 and 45, 49 are cooperating within the double wall portions or hollow spaces 22, 23, 24 and 28 of shell 3 whereby the inner walls 25, 26, 27 and 55 respectively of the double wall portions serve as a shield for preventing the light possibly entering through said snap-locking means from reaching the light-sensitive photographic material within the cassette. By using the snap-locking detent means in the way described hereabove, the external surface of the cassette can be kept smooth overall and free of any protuberances that may be prejudicious to safe handling of the cassette or to fitting the latter into apparatus intended for that purpose. It is quite obvious that other embodiments from the one described hereabove as a practical example can be realized without thereby departing from the scope of the present invention.

We claim:

1. A light-tight cassette suitable for holding a roll of web-like light-sensitive photographic material wound around a core and for dispensing the same through a slit provided in said cassette wherein said cassette is in the form of a box comprising a generally rectangular hollow shell having said material-dispensing slit extending in an axial direction in one corner thereof and having a generally smooth continuous surface around the exterior thereof from one slit edge to the other slit edge; closure walls for the shell ends, said end closure walls being generally rectangular corresponding to said shell and carrying inwardly directed central axially projecting hubs for rotatably supporting the ends of said core; latchable detent means for at least one of said end closure walls, said detent means comprising an aperture radially penetrating the shell at the three other corners thereof adjacent the associated end closure wall, said end closure wall carrying at its three corners corresponding to the perforated corners of said shell axially directed detent fingers each having a lateral projection thereon for engagement with said shell perforation to retain said end closure wall on the end of said shell; and situated radially inwardly of each perforated shell corner, an inner wall joined along its side edges to the interior wall of said shell and constituting a light shield preventing light passing through said shell perforations from intruding into the shell interior internally of said inner walls.

2. A cassette according to claim 1, characterized in that at least one of said end closure walls is provided with an opening through which a key is inserted into the cassette for cooperative engagement with said core, around which a roll of web-like light-sensitive photographic material is wound, and thereby locking the core in the cassette and preventing rotational movement of the roll within the cassette.

3. A cassette according to claim 2, characterized in that said core comprises two concentrically arranged cylinders which are secured to one another by a plurality of radially extending spokes or vanes wherein said key projects between adjacent pairs of said spokes or vanes in said core, thereby locking said core within said cassette and preventing clock-springing of the said roll or photographic material.

4. A cassette according to claim 1, characterized in that at least one of the said free edge of the said first and fourth walls is provided with a double wall portion.

5. A cassette according to claim 1, characterized in that at least one of said end closure walls has on its inner face spaced inner and outer peripheral wall portions defining a peripheral groove for receiving the corresponding end edge portion of said shell, and in that at least one of said end closure walls is provided with axially projecting guide tongues at said peripheral groove cooperating with corresponding hollow portions in said shell which are defined by said shell and said inner wall.

6. A cassette according to claim 5, characterized in that the said hollow portions in said shell extend across the entire axial dimension of said shell.

* * * * *